(12) United States Patent
Birch

(10) Patent No.: US 9,220,344 B2
(45) Date of Patent: *Dec. 29, 2015

(54) CONFIGURABLE SEATING DEVICE AND METHOD OF USE THEREOF

(71) Applicant: MULTISEAT, INC., Delmar, NY (US)

(72) Inventor: Richard R. Birch, Rensselaer, NY (US)

(73) Assignee: MULTISEAT, INC., Delmar, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/010,301

(22) Filed: Aug. 26, 2013

(65) Prior Publication Data

US 2013/0341976 A1 Dec. 26, 2013

Related U.S. Application Data

(63) Continuation of application No. 13/114,654, filed on May 24, 2011, now Pat. No. 8,517,462.

(51) Int. Cl.
| | |
|---|---|
| A47C 9/00 | (2006.01) |
| A47C 7/02 | (2006.01) |
| A01M 31/02 | (2006.01) |
| A47C 7/62 | (2006.01) |
| A47C 7/66 | (2006.01) |
| A47C 7/72 | (2006.01) |

(52) U.S. Cl.
CPC ............... *A47C 7/02* (2013.01); *A01M 31/02* (2013.01); *A01M 31/025* (2013.01); *A47C 7/62* (2013.01); *A47C 7/66* (2013.01); *A47C 7/72* (2013.01); *A47C 7/725* (2013.01); *Y10T 29/4984* (2015.01)

(58) Field of Classification Search
USPC ............... 297/230.1–230.13, 352, 4, 184.1, 297/184.14, 184.15, 217.6, 17, 129
See application file for complete search history.

(56) References Cited

U.S. PATENT DOCUMENTS

| | | | |
|---|---|---|---|
| 3,120,404 A | | 2/1964 | Bramming |
| 3,622,201 A | | 11/1971 | Radig |
| 3,985,387 A | * | 10/1976 | Rischar ............... 297/4 |
| 4,600,082 A | | 7/1986 | Rauls |
| 5,009,285 A | | 4/1991 | Ramsey |
| 5,186,276 A | | 2/1993 | Craig |
| 5,364,163 A | * | 11/1994 | Hardison ............ 297/344.21 |
| 5,409,291 A | * | 4/1995 | Lamb et al. ............ 297/129 |
| 5,516,193 A | | 5/1996 | Simpson |
| 5,524,956 A | | 6/1996 | Moore |

(Continued)

OTHER PUBLICATIONS

Office Action (mail date Dec. 13, 2012) for U.S. Appl. No. 13/114,654, filed Mat 24, 2011.

(Continued)

*Primary Examiner* — David R Dunn
*Assistant Examiner* — Alexander Harrison
(74) *Attorney, Agent, or Firm* — Schmeiser, Olsen & Watts, LLP

(57) ABSTRACT

A configurable seating device comprising a first portion configured to engage at least one object when in an open position, a second portion operably connected to the first portion, and a third portion operably connected to the second portion, wherein, when in the open position, a user is accommodated by the configurable seating device a distance above a ground surface, and the third portion is configured to contact the ground surface and is capable of supporting a weight of the user accommodated by configurable seating device is provided. Furthermore, an associated method is also provided.

22 Claims, 7 Drawing Sheets

(56) References Cited

U.S. PATENT DOCUMENTS

| | | |
|---|---|---|
| 5,803,542 A | 9/1998 | Insausti |
| 5,927,575 A | 7/1999 | Gatling |
| 5,944,379 A | 8/1999 | Yates |
| 6,056,353 A * | 5/2000 | Meara .............. 297/41 |
| 6,547,110 B2 | 4/2003 | O'Hare |
| 6,772,925 B2 | 8/2004 | O'Hare |
| 6,848,746 B2 | 2/2005 | Gentry |
| 7,040,635 B1 * | 5/2006 | Remole .............. 280/47.18 |
| 7,125,075 B2 | 10/2006 | Thompson |
| 7,156,465 B2 | 1/2007 | Stewart et al. |
| 7,219,680 B1 | 5/2007 | Gresock |
| 7,302,957 B2 | 12/2007 | Ross |
| 7,427,101 B1 | 9/2008 | Zernov |
| 7,438,356 B2 | 10/2008 | Howman et al. |
| 7,997,291 B2 | 8/2011 | Gressette et al. |
| 8,007,043 B1 | 8/2011 | Vuong |
| 8,152,236 B1 | 4/2012 | Romero |
| 8,182,030 B1 * | 5/2012 | Britten .............. 297/129 |
| 8,262,157 B2 | 9/2012 | Novak |
| 2004/0251717 A1 * | 12/2004 | Tamura .............. 297/17 |
| 2005/0183758 A1 | 8/2005 | Corbitt |
| 2005/0225126 A1 | 10/2005 | Frederick |
| 2006/0180393 A1 | 8/2006 | Peruski |
| 2007/0262102 A1 | 11/2007 | Rininger et al. |
| 2009/0039685 A1 | 2/2009 | Zernov |

OTHER PUBLICATIONS

Final Office Action (mail date Apr. 25, 2013) for U.S. Appl. No. 13/114,654, filed May 24, 2011.

Notice of Allowance (mail date Jul. 1, 2013) for U.S. Appl. No. 13/114,654, filed May 24, 2011.

* cited by examiner

CONFIGURABLE SEATING DEVICE AND METHOD OF USE THEREOF

CROSS-REFERENCE TO RELATED APPLICATIONS

This application claims priority to and the benefit of U.S. application Ser. No. 13/114,654, filed May 24, 2011, entitled "Configurable Seating Device and Method of Use Thereof."

FIELD OF TECHNOLOGY

The following relates to a configurable and transportable seating device, and more specifically to embodiments of a configurable, transportable seat for use while hunting and/or hiking.

BACKGROUND

Hunting is a wildly popular outdoors activity and a pastime in the United States and around the world. Many different hunting devices are employed to successfully locate animals while also minimizing movement and noise; one such hunting device is a tree stand. Tree stands utilize an open or enclosed platform that is secured to a tree to elevate the hunter and provide a better vantage point. However, setting up a tree stand requires not only a significant amount of hard work, load calculations, and time to ensure the safety of the hunter suspended above the ground on the platform, but the hunter must also carry a heavy platform, various tools, cables, and chains to effectively suspend the heavy platform. Furthermore, hunters who struggle with or simply cannot climb a ladder to reach a platform suspended in a tree, such as the elderly and disabled, cannot utilize a tree stand. Other hunting devices require the hunter to either sit on a cushion positioned directly on the ground, or assemble and disassemble a frame from a variety of single components that must be connected and disconnected from each other. Sitting directly on the ground can be very difficult or impossible for elderly and disabled hunters, and can become painful even for the most disciplined hunter after a prolonged period of time. Likewise, transporting a bag full of assembly components to build a frame not only slows a hunter down but cannot be done in a quiet manner so as to not scare off the wildlife.

Thus, a need exists for an apparatus and method for a hunting seat that is easily transportable, provides a comfortable hunting position, and can be set up quickly and quietly.

SUMMARY

A first general aspect relates to a configurable seating device comprising: a first portion, the first portion including a strap, wherein the strap is configured to securably engage a structure, a second portion hingedly connected to the first portion, and a third portion hingedly connected to the second portion, wherein the first portion, the second portion, and the third portion hingedly move from a first position to a second position, wherein, when in the first position, the first portion, the second portion, and the third portion are in a substantially vertical alignment, wherein, when in the second position, the second portion supports a user in a seated position a distance above the ground and the third portion extends from the second portion in a direction which elevates the second portion the distance above the ground.

A second general aspect relates to a configurable seating device having a first configuration and a second configuration, the seating device comprising: a first portion, a second portion, and a third portion, wherein, in the first configuration: the first portion is positioned in a first plane, the second portion is positioned in a second plane, and the third portion is positioned in a third plane, wherein the second plane is substantially parallel with the first plane, wherein, in the second configuration: the first portion is positioned in a fourth plane, the second portion is positioned in a fifth plane, and the third portion is positioned in a sixth plane, wherein the fifth plane is substantially perpendicular to the fourth plane.

A third general aspect relates to a method of forming a configurable seating device comprising: hingedly connecting a first portion to a second portion to a second end of a connection portion, and hingedly connecting a third portion to the second portion, wherein hingedly connecting the first portion, the second portion, and the third portion facilitates movement from a first position to a second position, wherein, when in the first position, the first portion, the second portion, and the third portion are in a substantially vertical carrying position, wherein, when in the second position, the second portion supports a user in a seated position a distance above the ground and the third portion extends from the second portion in a direction which elevates the second portion the distance above the ground.

The foregoing and other features of construction and operation will be more readily understood and fully appreciated from the following detailed disclosure, taken in conjunction with accompanying drawings.

BRIEF DESCRIPTION OF THE DRAWINGS

Some of the embodiments will be described in detail, with reference to the following figures, wherein like designations denote like members, wherein.

DETAILED DESCRIPTION

A detailed description of the hereinafter described embodiments of the disclosed apparatus and method are presented herein by way of exemplification and not limitation with reference to the Figures. Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure.

As a preface to the detailed description, it should be noted that, as used in this specification and the appended claims, the singular forms "a", "an" and "the" include plural referents, unless the context clearly dictates otherwise.

Figures 1, 2:
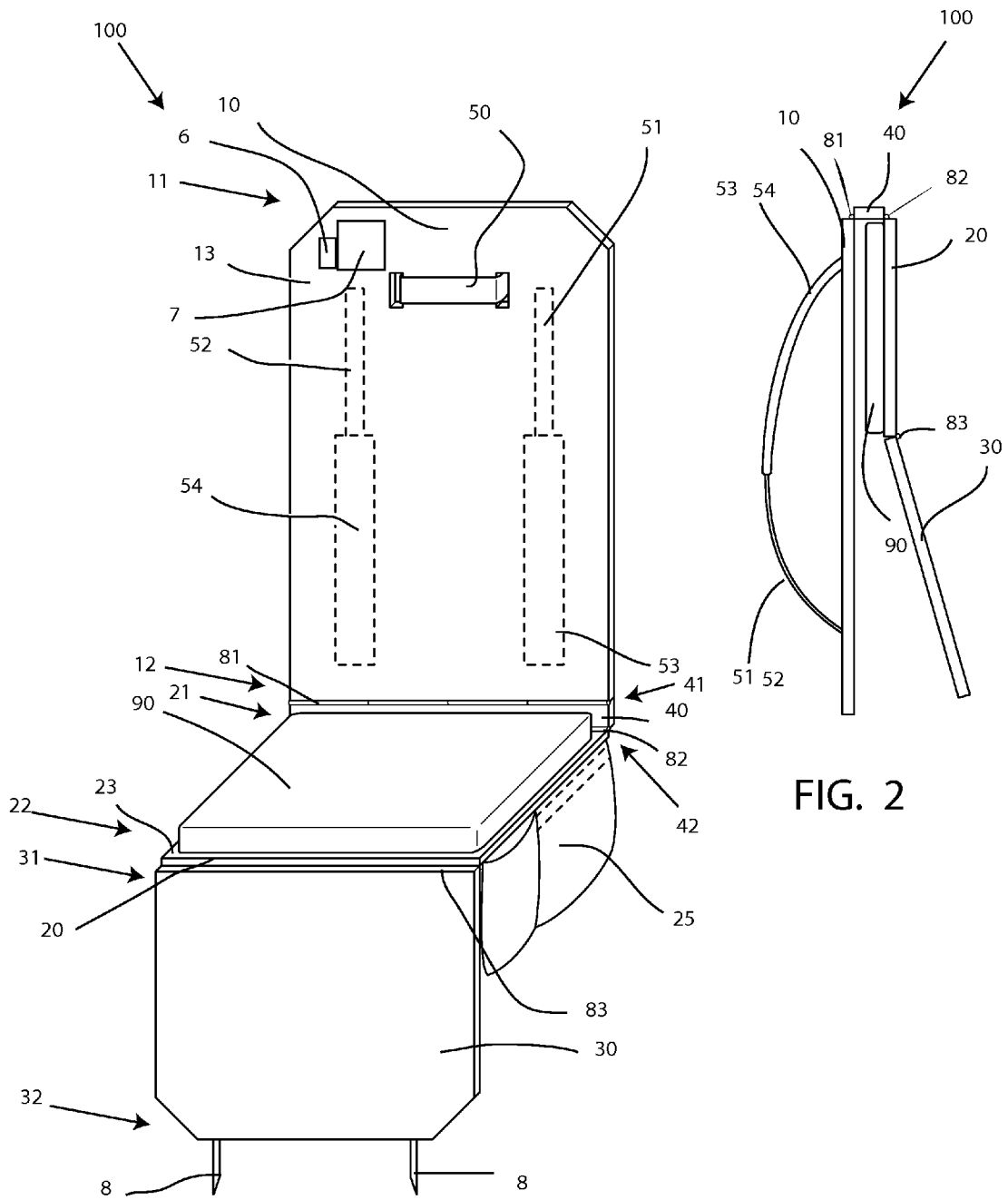
FIG. 1 depicts a perspective view of a first embodiment of a configurable seating device.
FIG. 2 depicts a side view of the first embodiment of the configurable seating device in a second position.
Figure 3:
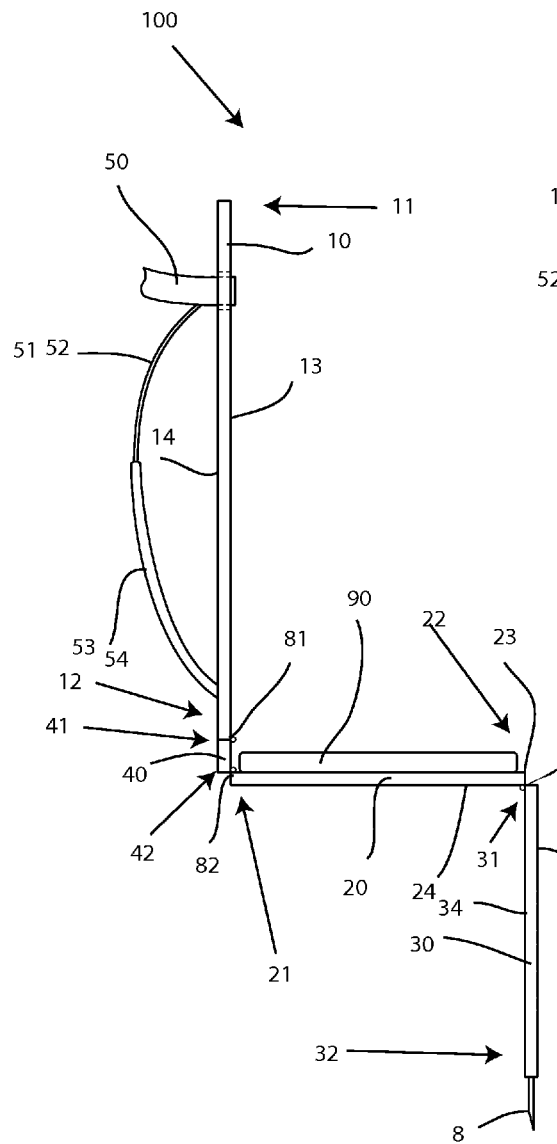
FIG. 3 depicts a side view of the first embodiment of the configurable seating device in a first position.

Referring to the drawings, FIG. 1 depicts an embodiment of a configurable seating device 100. Seating device 100 may be configured to engage a structure 3 (shown in FIG. 6), such as a tree, post, pole, beam, stump, and the like, or any object or structure that may reliably provide support or stability for the seating device 100. Engaging the structure 3 may include fastening the seating device 100 to the structure 3, utilizing various means to secure the seating device 100 to the structure 3, such as a tree, or otherwise coupling the seating device 100 to the structure 3 at one or more locations. A wedge element (not shown) may be attached to the backside of the seating device 100, wherein the wedge element is configured to outwardly pivot from the seating device 100 to incrementally engage the structure 3 having various thicknesses. Embodiments of seating device 100 may be worn by a user while the user performs various outdoor, mobile, activities, such as hunting, hiking, walking, tracking, traveling, biking, and the like. Additionally, embodiments of seating device 100 may be function as a seat, stand, bench, chair, stool, and the like, or any device that can provide a generally horizontal (with respect to the ground) surface for a person to sit on, stand on, kneel on, etc. Embodiments of seating device 100 may come in a preassembled unit to a consumer, or may be sold in a disassembled position in the form of multiple components. Furthermore, embodiments of seating device 100 may include a first portion 10, a second portion 20, a connection portion 40, and a third portion 30. Further embodiments of the seating device 100 may include a first portion 10, the first portion 10 including a strap 50, wherein the strap 50 is configured to securably engage a structure 3, a second portion 20 hingedly connected to the first portion 10, and a third portion 30 hingedly connected to the second portion 20, wherein the first portion 10, the second portion 20, and the third portion 30 hingedly move from a first position to a second position, wherein, when in the first position, the first portion 10, the second portion 20, and the third portion 30 are in a substantially vertical alignment, wherein, when in the second position, the second portion 20 supports a user in a seated position a distance above the ground and the third portion 30 extends from the second portion 20 in a direction which elevates the second portion 20 the distance above the ground. Embodiments of the seating device 100 may weigh 4-12 pounds, and may have various dimensions. For example, one embodiment of the seating device may be 14" width×30" height, another embodiment may be 18" width×"30" height. Those skilled in the art should appreciate that the seating device 100 may range in size (width, depth, length, weight, etc.) to accommodate demands and other market/industry requests.

Referring now to FIGS. 1-4, embodiments of the seating device 100 may include a first portion 10. The first portion 10 may have a first end 11 and a second end 12, a first side 13, and a second side 14. Embodiments of the first portion 10 may be a back support member configured to rest against the structure 3 on the second side 14, and support/contact/accommodate a user's back on the first side 13. Further embodiments of the first portion 10 may include a padded section (not shown) adhered or otherwise attached to the first side 13 to increase comfort to the user. The first portion 10 may be hingedly connected to a first end 41 of the connection portion 40 proximate the second end 12 of the first portion 10. The connection portion 40 may be a structural member configured to increase an angle of rotation and increase the space between the first portion 10 and the second portion 20 while in the first, closed position. For example, the connection portion 40 can allow the first portion 10 to be parallel or substantially parallel with the second portion 20 and include a space therebetween when in a first, closed, carrying position. Embodiments of the connection 40 may be comprised of the same material(s) as the first portion 10. Alternatively, the first portion 10 may be hingedly connected directly to the second portion 20 through a hinged connection which allows 180° of rotation, but offers a smaller space between the first portion 10 and the second portion 20. The connection between the first portion 10 and the second portion 20 (or with the connection portion 40) may be a first hinged connection 81. The first hinged connection 81 may be a connection between two objects, such as the first portion 10 and the connection portion 40, wherein a limited angle of rotation about a fixed axis is allowed between them. Embodiments of the first hinged connection 81 may allow an angle of rotation between the first portion 10 and the connection portion 40 up to approximately 270° about a fixed axis defined by the first hinged connection 81. However, an angle of rotation between the first and second portion 10, 20 may be less than 270° and greater than 270° depending on the type of hinge means and the design requirements of the seating device 100. Embodiments of the hinged connection 81 (or hingedly connecting the first portion 10 to the second portion 20 or the connection portion 40) may utilize a strap hinge, a T-hinge, a piano hinge, or any suitable hinge known to those having skill in the art.

Figure 5:
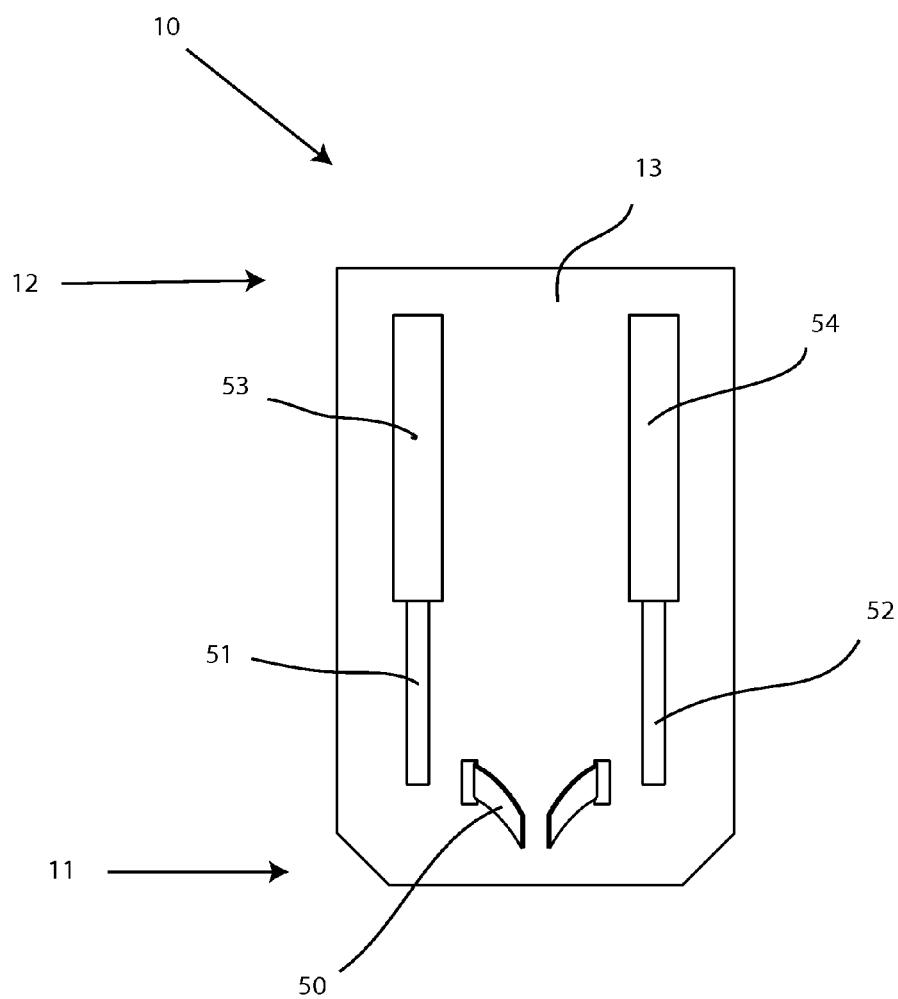
FIG. 5 depicts a front view of an embodiment of a first portion.

Moreover, the first portion 10 may include a strap 50 configured to securably engage a structure 3. Embodiments of strap 50 may be a belt, band, harness, leash, tie, string, bungee cord, or any suitable device that can wrap or surround a structure 3. The strap 50 may be an elastic material to allow some flex when wrapping the strap 50 around structure 3, or may be semi-rigid to customizably engage/wrap around a structure 3. Other embodiments of strap 50 may include a strip of material utilizing hook and loop fasteners, such as Velcro® material to secure a connection to/around a diameter of the structure 3, such as a tree. The strap 50 may pass through openings in the first portion 10 proximate the first end 11 and then open up (or split apart), as shown in FIG. 5, to wrap around a structure 3 and then fasten (e.g. two flaps joining together) to help prevent the seating device 100 from moving from side to side and to promote overall stability when a user sits on the seating device 100 in the second, open position. Various embodiments of strap 50 may be used, including a strap that may be tightened by pulling an excess amount of material to tighten the strap 50 around the structure 3. A second strap device, such as a bungee cord, may be used to initially secure or hinder excess movement of the seating device 100 prior to or during the fastening of strap 50. For example, the secondary strap device may wrap around the seating device 100 and the structure 3 for temporary stability while a user fastens the strap 50 around the structure 3. The secondary strap device may be removed once the strap 50 is securably fastened around the structure 3, or may remain as additional support for the seating device 100.

Embodiments of the first portion 10 may be a planar surface, having a continuous, solid surface, as shown in FIGS. 1-8, with the exception of a plurality of openings that may allow the passage of strap 50, a securing strap 255, and/or one or more shoulder straps 51, 52 through the first portion 10, 210 (i.e. an opening defined by an opening through the first portion 10 starting at the first side 13 and ending through the second side 14). The first portion 10 may be comprised of wood, lightweight metal or metal alloy, composites, hard plastic, and the like, or a combination thereof. Manufacture of embodiments of the first portion 10 may depend on the material(s) comprising the first portion 10. For instance, the first portion 10 may be manufactured through injection molding processes, or similar manufacturing processes associated with plastics and similar synthetic materials.

Referring still to FIGS. 1-4, embodiments of the first portion 10 may include one or more shoulder straps 51, 52. The shoulder straps 51, 52 (i.e. an end of each strap 51, 52) may be fastened to a section of the first portion 10 located in one or more openings in the first portion 10 proximate the first end 11, and may fasten to a section of the first portion 10 located in one or more openings in the first portion 10 proximate the second end 12, wherein a length of material connects the ends of the straps 51, 52 fastened to the first portion 10. The length of material of the shoulder straps 51, 52 may be a length which allows a user to put an arm through and ultimately wear the shoulder strap 51, 52 over a user's shoulder, very similar to a backpack having shoulder straps. Other embodiments of the shoulder straps 51, 52 may be fastened or adhered to the surface of the second side 14 of the first portion 10 proximate the first end 11 and may be fastened or adhered to the surface of the second side 14 proximate the second end 12. Further embodiments of the shoulder straps 51, 52 may include a portion which is molded or embedded into the first portion 10 proximate the first end 11 and a portion which is also molded or embedded into the first portion 10 proximate the second end 12, wherein a length of material connects the two portions. Accordingly, embodiments of the seating device 100 may include a set of shoulder straps 51, 52 connected to the first portion 10 to accommodate a load of the seating device 100 (e.g. a load may be the weight (lbs) of the seating device 100 and any accessories attached thereto) when worn by the user. The set of shoulder straps 51, 52 may each include a padded section 53, 54 to comfort the user, when the user is wearing/carrying the seating device 100 (when the seating device 100 is in the first, closed position. Those skilled in the requisite art should appreciate that various designs of the shoulder straps 51, 52 may be employed to increase comfort and to reduce the load of the seating device 100 onto the user's shoulders. For example, the seating device 100 may include one shoulder strap 51 that is designed to go across the user's body. In another embodiment, the seating device 100 may include two or more straps 51, 52 that go over each shoulder. Furthermore, embodiments of the shoulder straps 51, 52 may be adjustable; the adjustable shoulder straps 51, 52 may be adjustable in length to accommodate different heights, weights, sizes, etc. of individual users. The shoulder straps 51, 52 may be adjustable through the use of various means, known to the skilled in the art, such as a slidable buckle tightening the straps or loosening the straps over the user's body.

Furthermore, embodiments of the seating device 100 may include a second portion 20. The second portion 20 may be a flat portion configured to accommodate and support a user in a sitting, kneeling, or standing position. The second portion 20 may have a first end 21 and a second end 22, a first side 23, and a second side 24. The second portion 20 may be hingedly connected to a second end 42 of the connection portion 40 proximate the first end 21 of the second portion 20. The connection between the second portion 20 and the first portion 10 can be the first hinged connection 81; however, if the second portion 20 is connected to the connection portion 40, the hinged connection may be a second hinged connection 82. The second hinged connection 82 may be a connection between two objects, such as the second portion 20 and the connection portion 40, wherein a limited angle of rotation about a fixed axis is allowed between them. Embodiments of the second hinged connection 82 may allow an angle of rotation between the second portion 20 and the connection portion 40 of approximately 270° about a fixed axis defined by the second hinged connection 82. However, an angle of rotation between the second portion 20 and the connection portion 40 may be less than 270° and greater than 270° depending on the type of hinge means and the design requirements of the seating device 100. Embodiments of the second hinged connection 82 (or hingedly connecting the second portion 20 to the connection portion 40) may utilize a strap hinge, a T-hinge, a piano hinge, or any suitable hinge known to those having skill in the art.

Moreover, embodiments of the second portion 20 may include one or more detachable pouches 25 attached to the side(s) of the second portion 20. The detachable pouch 25 may be removably attached to the second portion 20 by placing hook and loop fastener (Velcro®) strip on an adjacent edge(s) of the second portion 20 and a corresponding hook and loop fastener strip on the pouch 25. Those having skill in the art should appreciate that the one or more detachable pouches 25 may be removably attached to the second portion 20 using means other than hook and loop fasteners. Alternatively, the pouches 25 may be non-detachable, such as having a portion of the pocket molded or embedded, nailed, glued, and the like, into the second portion 20. Accordingly, the one or more pouches 25 may be easily removed and attached based on the user's needs to store various items. Embodiments of the detachable pouches 25 may be a single pouch member having multiple individual pockets, or may include a single pouch member forming a single pocket. Various pocket designs may be detachably attached (or non-detachably attached) to the second portion 20 to accommodate various items, such as tools, hand warmers, water bottles, ammunition, clothing, etc. The pouch 25 may be comprised of a non-rigid material, such as a fabric sewn together to form a pocket, pouch, multiple pockets, a zipper pocket, and the like, to allow the detachable pouch 25 to be easily folded onto or below the second portion 20 so as to not interfere with the seating device 100 switching from the first position to the second position, and vice versa.

Embodiments of the second portion 20 may be a planar surface, having a continuous, solid surface, as shown in FIGS. 1-8, with the exception of a plurality of openings that may allow the fastening of one or more detachable pouches 25. The second portion 20 may be comprised of wood, lightweight metal or metal alloy, composites, hard plastic, and the like, or a combination thereof. Manufacture of embodiments of the second portion 20 may depend on the material(s) comprising the second portion 20. For instance, the second portion 20 may be manufactured through injection molding processes, or similar manufacturing processes associated with plastics and similar synthetic materials.

With reference still to FIGS. 1-4, embodiments of the seating device 100 may include a third portion 30. The third portion 30 may have a first end 31 and a second end 32, a first side 33, and a second side 34. Embodiments of the third portion 30 may be a support member for the second portion 20 configured to contact the ground. For instance, the third portion 30 may extend from the second portion 20 in a direction which elevates the second portion 20 a distance above the ground so the user is not sitting close to the ground, but rather in a comfortable sitting position a distance above the ground with the user's legs comfortably extended or comfortably bent. The third portion 30 may be an extension portion. The third portion 30 may be hingedly connected to the second portion 20 through a hinged connection. The connection between the third portion 30 and the second portion 20 may be a third hinged connection 83. The third hinged connection 83 may be a connection between two objects, such as the third portion 30 and the second portion 20, wherein a limited angle of rotation about a fixed axis is allowed between them to maximize stability of the seating device 100 when in the second, open position. Embodiments of the third hinged connection 83 may allow an angle of rotation between the third portion 30 and the second portion 20 of approximately 90° about a fixed axis defined by the third hinged connection 81. For instance, in the second position, the second end 32 of the third portion 30 can contact the ground to elevate the second portion 20 off of the ground, wherein the contact between the third portion 30 and the ground may be approximately perpendicular to avoid the collapse of the seating device 100. However, an angle of rotation between the second portion 20 and the third portion 30 may be less than 90° and greater than 90° depending on the type of hinge means, terrain, and the design requirements of the seating device 100. Embodiments of the third hinged connection 83 (or hingedly connecting the third portion to the second portion 20) may utilize a strap hinge, a T-hinge, a piano hinge, or any suitable hinge known to those having skill in the art.

Moreover, the third portion 30 may include at least one spike element 8 to securely fasten the seating device 100 into the ground. Embodiments of the spike element(s) 8 may be a metal, wood, or plastic stake, a tent stake, a pointed rod, or any suitable member capable of piercing into the ground a distance. The spike element 8 may be a separate structural mechanical member or may be structurally integral with the third portion 30. Furthermore, the spike element(s) 8 may be attached to the third portion 30 proximate the second end 32 at various locations along an adjacent edge of the third portion 30. Those skilled in the art should appreciate that the number of spike elements 8 and the various locations may vary depending on the design requirements of the seating device 100.

Figure 4:
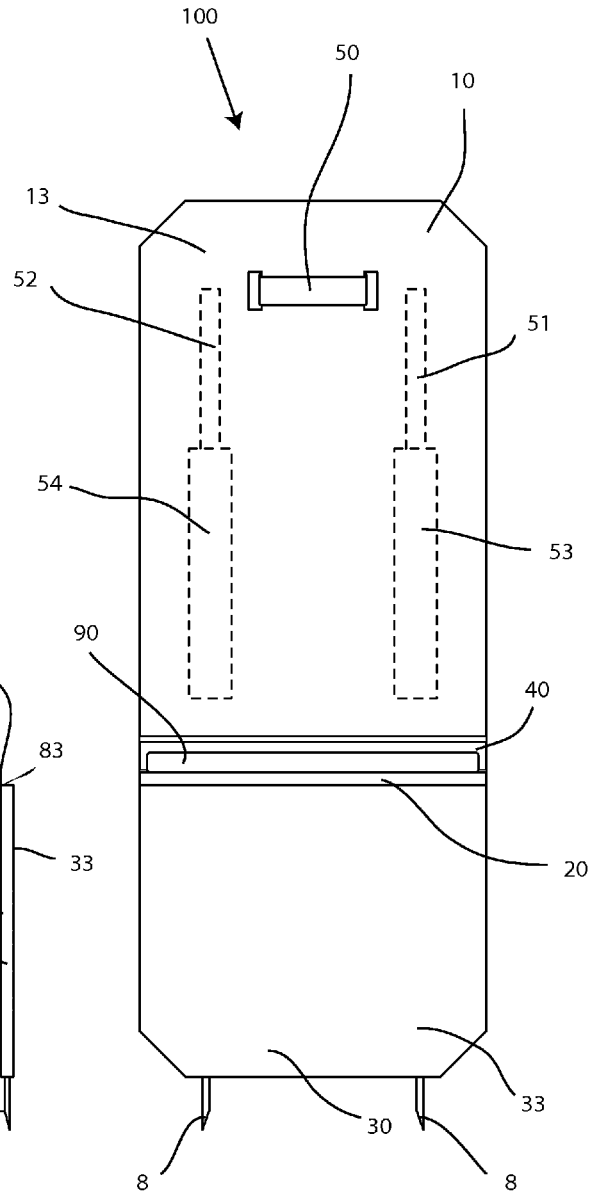
FIG. 4 depicts a front view of the first embodiment of the configurable seating device in the first position.

Embodiments of the third portion 30 may be a planar surface, having a continuous, solid surface, or may have an opening 37 as shown in FIG. 4. The opening 37 may reduce the weight of the seating device 100. The third portion 30 may be comprised of wood, lightweight metal or metal alloy, composites, hard plastic, and the like, or a combination thereof. Manufacture of embodiments of the third portion 30 may depend on the material(s) comprising the third portion 30. For instance, the third portion 30 may be manufactured through injection molding processes, or similar manufacturing processes associated with plastics and similar synthetic materials.

Figure 7:
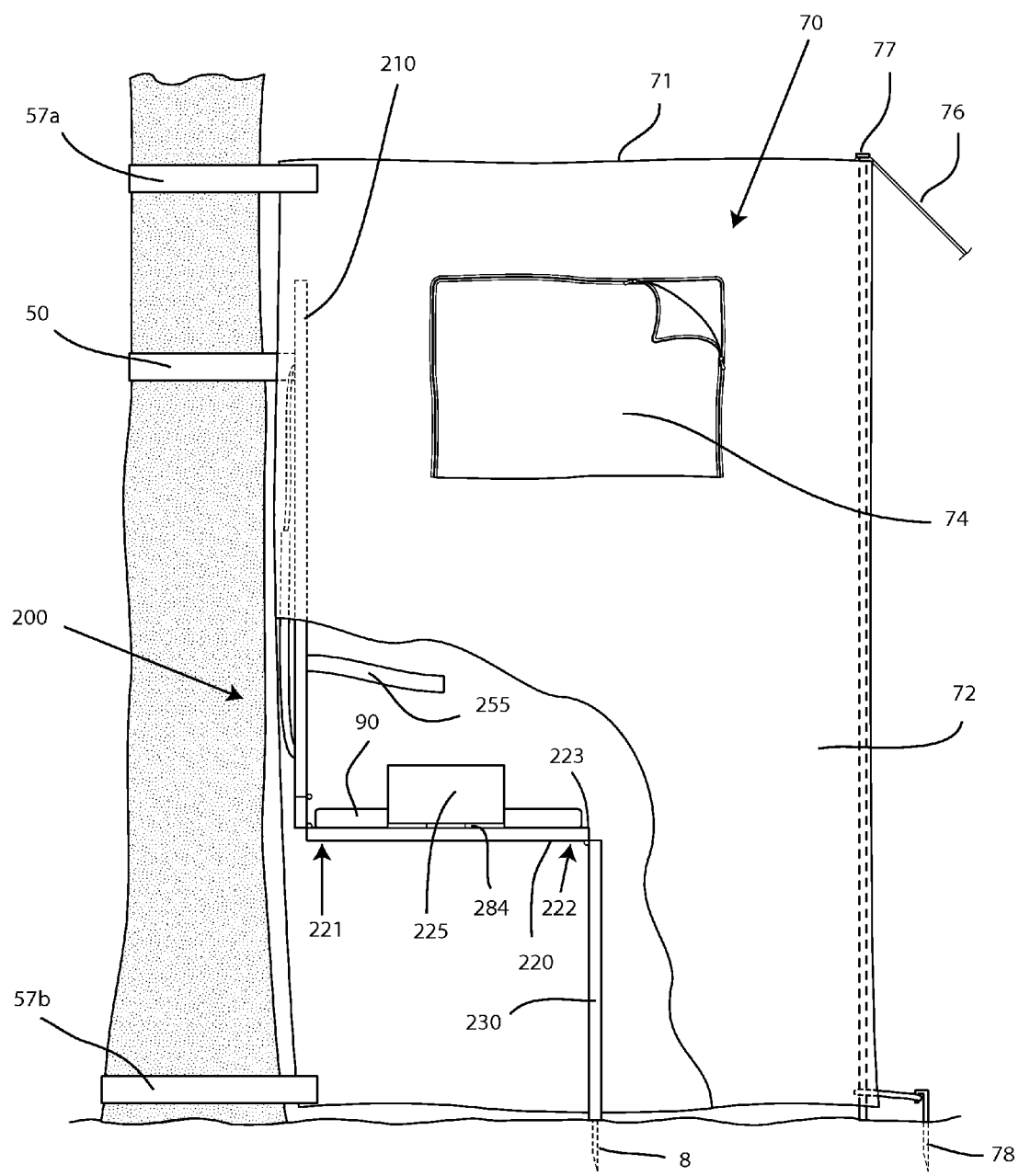
FIG. 7 depicts a side view of a second embodiment of the configurable seating device, including an embodiment of a shelter system.
Figure 8:
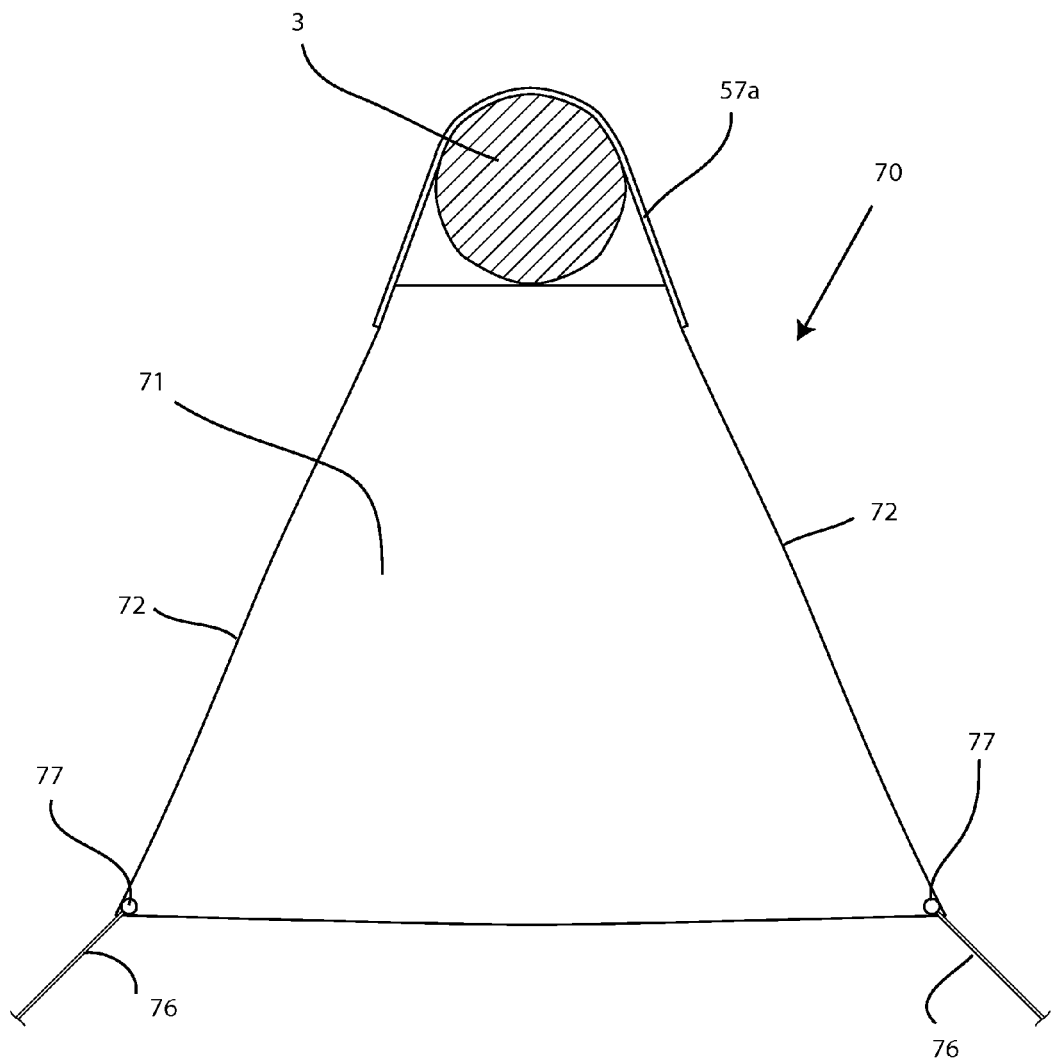
FIG. 8 depicts a top view of an embodiment of the shelter system.

With continued reference to the drawings, FIGS. 7 and 8 depict an embodiment of seating device 200. Embodiments of seating device 200 may share the same or substantially the same structural components and function as seating device 100. For instance, embodiments of the seating device 200 may include a first portion 210, a second portion 220, a connection portion 240, and a third portion 230. However, embodiments of seating device 200 may include at least one side structure 225 foldably/hingedly attached to the second portion 220 at a fourth hinged connection 284, wherein, when the at least one side structure 225 is an upright position, the side structure 225 may prevent the user from falling off the second portion. Embodiments of seating device 200 may include a side structure 225 on each side of the second portion 220, erected from the first side 223 of the second portion 225. The side structure 225 may be a rigid structure having various designs (e.g. arm rest, safety bar, and the like) and comprised of the same or different materials than the second portion 220 (e.g. wood, plastic, lightweight metal, etc.) that can hinder or prevent a user, such as a disabled person, from falling off the side of the second portion 220. The fourth hinged connection 284 may be located on an adjacent side edge of the second portion 220 to allow a user to quickly and easily raise the side structure 225 up from the first side 223 of the second portion 220 into an upright position. The upright position of the side structure 225 may be locked into place through various mechanical devices, and the hinged connection 284 may prevent further rotation of the side structure 225 beyond the upright position in a direction away from the second portion 220. Moreover, embodiments of the seating device 200 may further include a securing strap 255 positioned on the first portion 210, the securing strap 225 configured to wrap around a torso (e.g. waist, shoulder, legs, chest, etc.) of the user to support the user while in the seated position on the second portion 220 when the seating device 200 is in the second position. For example, the securing strap 255 may act as a safety belt to secure a user, such as a disabled person, into a safe and comfortable position. The securing strap 255 may be positioned at any location between the first end 211 and the second end 212 of the first portion 210. Embodiments of the securing strap 255 may be adjustable; the adjustable securing strap 255 may be adjustable in length to accommodate different heights, weights, sizes, needs, etc. of individual users. The securing strap 255 may be adjustable through the use of various means, known to the skilled in the art, such as a slidable buckle tightening the strap or loosening the strap over the user's body/torso. Embodiments of the seating device 200 may include more than one securing strap 255 to safely and comfortably secure a user in a fixed, typically upright position.

Referring again to FIG. 1, embodiments of the seating device 100 (and seating device 200) may further include a receiver 6 operably connected to a light source 7. For example, the receiver 6 may be in electrical and physical communication with the light source 7, such that receiver 6 may send an electrical signal to the light source 7 to actuate the light source 7. Embodiments of the receiver 6 and the light source 7 may be battery operated (e.g. rechargeable battery) to allow for use in areas void of mains power. The receiver 6 and the light source 7 may be disposed proximate the seating device 100, 200, or may be fixedly or removably attached to at least one of the first portion 10, 210, the second portion 20, 220, and the third portion 30, 230. The receiver 6 can receive a transmission from a remote device to activate/actuate the light source 7 to provide light and visibility to a user. For instance, a user may operate a remote device in communication with the receiver 6 to turn on the light source 7 when approaching the seating device at night, or a low visibility environment. Embodiments of the light source 7 may be a LED light, a spotlight, a flashlight removably attached to the seating device 100, 200 via a frame, a strobe light, and the like, and may emit radiation across the color spectrum.

Referring back to FIGS. 7 and 8, embodiments of the seating device 100, 200 may further include a shelter system 70 that may substantially enclose the seating device 100, 200. Embodiments of the shelter system 70 may include a plurality of shelter walls 72, a canopy 71, at least one shelter strap 57a, 57b attached to the structure 3, at least one supporting rod 77, and at least one elastic strap 76. The shelter system 70 may provide a shelter for a user seeking shelter from environmental conditions, or may provide a blind for avoiding being spotted by various animals/game. The shelter system 70 may include a plurality of walls 72 forming an enclosure on two or more sides of the user, or the structure 3. Shelter straps 57a, 57b may be attached to the shelter system 70 and configured to wrap around and securably fasten the shelter system 70 to the structure 3. The plurality of walls 72 may be integral with a canopy 71, or the canopy 71 may be removable attached to the plurality of walls 72 to provide shelter or protection from above, such as from sunlight or rain. Embodiments of the walls 72 may include a flap 74 that can be dropped, zippered, or pulled down to create an opening for visibility and/or airflow; a screen or similar mesh patterned material may be positioned within the opening 74 of the walls 72. The flap 74 may be a zippered fold down flap that can be zippered up or down at various positions to control the size of the opening in the shelter walls 72. The shelter system 70 may further include a shelter strap 57a, 57b to securably removably fasten the shelter system 70 to the structure 3 at various locations on the structure 3. Additionally, one or more supporting rods 77 may be placed into the ground or on the ground in an upright position to form a rigid structure for which the shelter walls 72 and the canopy may removably or integrally attach to erect the shelter system 70. An elastic strap 76 may be used to connect the supporting rods 77 to a stake 78 in the ground for added stability and structural support of the shelter system 70. The shelter system 70 may be camouflaged to reduce visibility of the shelter system 70, or may be hunter orange to indicate its existence/location to others. The shelter system 70 may further include a hunter orange pull-out safety flap.

Figure 9:
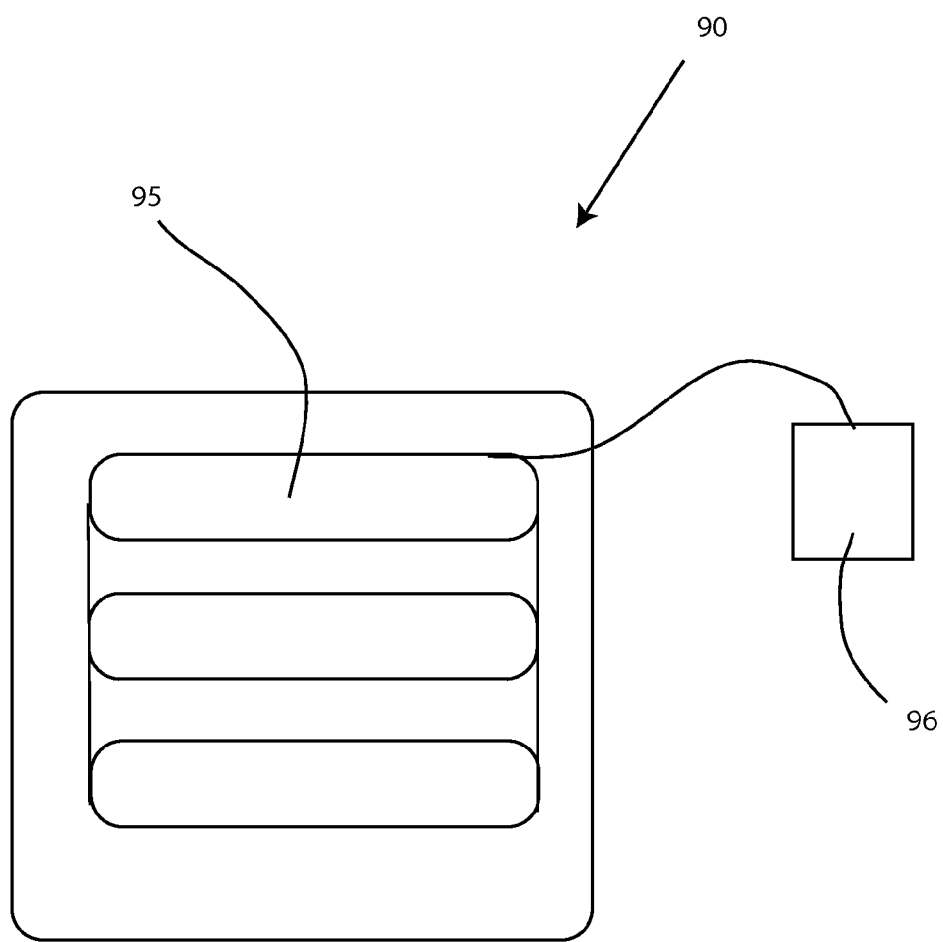
FIG. 9 depicts a schematic view of an embodiment of a heated seat cushion.

With additional reference to FIG. 9 embodiments of the seating device 100, 200 may further include a removable seat cushion 90 attached to the second portion 20, 220 (e.g. the first side 23 of the second portion 20). For instance, the seat cushion 90 may be removably attached to the second portion 20, 220. The removable seat cushion 90 may have a rechargeable battery 96 operably attached to the removable seat cushion 90, wherein the removable seat cushion 90 includes a heating coil 95 disposed within to heat the removable seat cushion 90. Thus, a user may attach (or the seat cushion 90 may be pre-attached prior to achieving the second, open position) to the second portion 20 to increase comfort while sitting on the second portion, while also providing warmth to the user.

Moreover, embodiments of the seating device 100, 200 may further include a cover portion. The cover portion may be attached to the seating device 100, 200, configured to cover the seating device 100, 200 when the seating device 100, 200 is in the first, closed position, or the second, open position. The cover portion may be a cover, storm flap, hood, and the like, that may fold over the seating device 100, 200 to cover/shield the device from environmental pollutants, such as rain and moisture. The cover portion may be comprised of any fabric, or non-rigid material that can be manipulated to cover and conform to the rigid structure of the seating device 100, 200.

Figure 6:
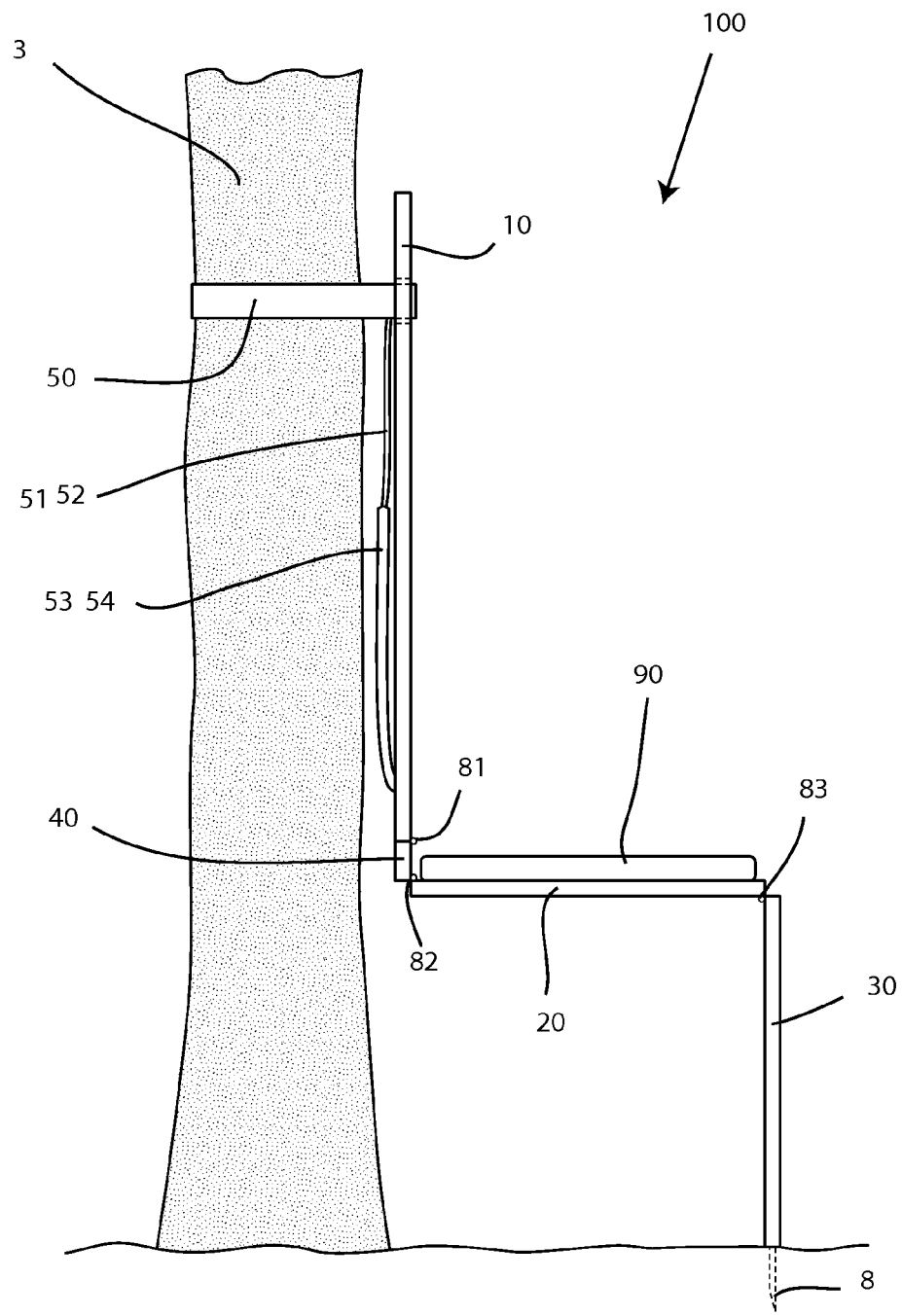
FIG. 6 depicts a side view of the first embodiment of the configurable seating device securably engaged to an embodiment of a structure.

The manner in which the seating device 100, 200 can be moved (hingedly, foldably, etc.) from a first position to a second position will now be described in further detail. FIG. 2 depicts an embodiment of the seating device 100, 200 in a first position. The first position may be a closed, carrying position, wherein the user can wear the seating device 100, 200 while walking or riding. In the first position, the first portion 10, 210, the second portion 20, 220, and the third portion 30, 230 are in a substantially vertical alignment. A substantially vertical alignment does not mean that each portion may always be exactly parallel with each other or vertical. For example, the third portion 30 could be only substantially parallel with the other portions 10, 210, 20, 220, as shown in FIG. 2. However, the substantially vertical alignment of the seating device 100, 200 in the first position makes it easier for a user to maneuver while mobile, and efficiently concentrates and translates the load of the seating device 100, 200. In other words, in the first position (or the first configuration), the first portion 10, 210 is positioned in a first plane, the second portion 20, 220 is positioned in a second plane, and the third portion 30, 230 is positioned in a third plane, wherein the second plane is substantially parallel with the first plane. In some embodiments of the seating device 100, 200, a strap, belt, or comparable device may be used to secure and prevent the portions 10, 210, 20, 220, 30, 230 from unfolding, or switching back to the open position, when in the first position (e.g. embodiments of the seating device 100, 200 without a connection portion 40). FIG. 6 depicts an embodiment of the seating device 100, 200 in a second position. Substantially parallel may include orientations close to parallel and exactly parallel. The second position may be an open, unfolded position, wherein the user can sit, kneel, stand, etc., on the seating device 100, 200. In the second position, the second portion 20, 220 can support a user in a seated position a distance above the ground, and the third portion 30, 230 extends from the second portion 20, 220 in a direction which elevates the second portion 20, 220 the distance above the ground. In other words, in the second position (or second configuration), the first portion 10, 210 is positioned in a fourth plane, the second portion 20, 220 is positioned in a fifth plane, and the third portion 30, 230 is positioned in a sixth plane, wherein the fifth plane is substantially perpendicular to the fourth plane. The seating device 100, 200 may be switched from the first position to the second position, and vice versa, by turning the device over on itself, and allowing the weight of the portions 10, 210, 20, 220, 30, 230 and gravity to displace the portions 10, 210, 20, 220, 30, 230 in directions allowed by the hinged connections 81, 82, 83. Other embodiments of the seating device 100 need only allow the weight of the portions 10, 210, 20, 220, 30, 230 and gravity displace the portions 10, 210, 20, 220, 30, 230 into the first or second position. In some embodiments, the user may need to assist the movement of the portions 10, 210, 20, 220, 30, 230 depending on the freedom of movement governed by the tightness of the hinged connections 81, 82, 83 and/or constraints of the environment (e.g. if device 100, 200 is laid on the ground).

Referring to FIGS. 1-9, embodiments of a method of forming a configurable seating device may include the steps of hingedly connecting a first portion 10, 210 to a second portion 20, 220, and hingedly connecting a third portion 30, 230 to the second portion 20, 220, wherein hingedly connecting the first portion 10, 210, the second portion 20, 220, and the third portion 30, 230 facilitates movement from a first position to a second position, wherein, when in the first position, the first portion 10, 210, the second portion 20, 220, and the third portion 30, 330 are in a substantially vertical carrying position, wherein, when in the second position, the second portion 20, 220 supports a user in a seated position a distance above the ground and the third portion 30, 330 extends from the second portion 20, 220 in a direction which elevates the second portion 20, 220 the distance above the ground. Embodiments of the method may further include the steps of positioning a strap 50 proximate a first end 11, 211 of the first portion 10, 210 to securably engage a structure 3, hingedly attaching at least one side structure 225 to the second portion 20, 220, wherein, when the at least one side structure 225 is an upright position, prevents the user from falling off the second portion 20, 200, positioning a securing strap 255 proximate a second end 12, 212 of the first portion 10, 210, the securing strap 255 configured to wrap around a torso of the user to support the user while in the seated position on the second portion 20, 220 when the seating device is in the second position, positioning a receiver 6 operably connected to a light source 7 on at least one of the first portion 10, 210, the second portion 20, 220, and the third portion 30, 330, wherein the receiver 6 receives a transmission from a remote device to activate the light source 7, and enclosing the first portion 10, 210, second portion 20, 220, and the third portion 30, 230 with a shelter system 70, wherein the shelter system 70 includes a plurality of shelter walls 72, canopy 71, a shelter strap 57 attached to the structure 3, at least one supporting rod 77, and at least one elastic strap 76.

While this disclosure has been described in conjunction with the specific embodiments outlined above, it is evident that many alternatives, modifications and variations will be apparent to those skilled in the art. Accordingly, the preferred embodiments of the present disclosure as set forth above are intended to be illustrative, not limiting. Various changes may be made without departing from the spirit and scope of the invention, as required by the following claims. The claims provide the scope of the coverage of the invention and should not be limited to the specific examples provided herein.

What is claimed is:

1. A configurable seating device comprising:
    a first portion configured to engage at least one object when in an open position;
    a second portion operably connected to the first portion, the second portion having a first end and a second end that is distal from the first end, wherein the first portion is operably connected to the first end of the second portion, and the second end defining an edge extending along the second end of the second portion from a first end of the edge to a second end of the edge; and
    a third portion operably connected to the second portion at the second end of the second portion, the third portion having a length that extends between a first end and a second end, wherein the third portion is a single leg structure, and is pivotably connected along the edge of the second portion;
    wherein, when in the open position, a user is accommodated on the second portion that is a distance above a ground surface that corresponds to the length of the third portion, and the third portion is configured to contact the ground surface and is capable of supporting a weight of the user accommodated by the second portion of the configurable seating device.

2. The configurable seating device of claim 1, wherein the user does not wear the configurable seating device in the open position.

3. The configurable seating device of claim 1, wherein the first portion is a back support member configured to rest against a tree.

4. The configurable seating device of claim 1, further comprising:
    at least one side structure foldably attached to the second portion, wherein, when the at least one side structure is in an upright position, resists the user from falling off the second portion; and
    a securing strap positioned on the first portion, the securing strap configured to wrap around a torso of the user to support the user while accommodated by the configurable seating device in the open position.

5. The configurable seating device of claim 1, further comprising:
    a set of shoulder straps connected to the first portion to accommodate a load of the configurable seating device when worn by the user, the shoulder straps including a padded section to comfort the user;
    at least one spike element positioned on the third portion to fasten the third portion in the ground; and
    at least one detachable pouch attached to the second portion.

6. The configurable seating device of claim 1, further comprising:
    a receiver operably connected to a light source, the receiver and the light source disposed proximate the configurable seating device, wherein the receiver receives a transmission from a remote device to activate the light source.

7. The configurable seating device of claim 1, wherein the configurable seating device is substantially enclosed by a shelter system, wherein the shelter system includes a plurality of shelter walls, a canopy, a shelter strap attached to the structure, at least one supporting rod, and at least one elastic strap.

8. The configurable seating device of claim 1, wherein the first portion, the second portion, and the third portion have a continuous, solid surface.

9. The configurable seating device of claim 1, further comprising:
    a removable seat cushion attached to the second portion, the removable seat cushion having a rechargeable battery operably attached to the removable seat cushion;
    wherein the removable seat cushion includes a heating coil disposed within to heat the removable seat cushion.

10. The configurable seating device of claim 1, wherein the first portion is hingedly connected to a first end of a connection portion, and the second portion is hingedly connected to a second end of the connection portion.

11. A method comprising:
    connecting a first portion configured to engage at least one object when in an open position to a first end of the second portion; and
    connecting a third portion to a second end of the second portion, the third portion having a length that extends between a first end and a second end, wherein the third portion is a single leg structure, and the second end of the second portion including an edge extending along the second end of the second portion from a first end of the edge to a second end of the edge, further wherein the third portion is pivotably connected along the edge of the second portion;
    wherein, when in the open position, a user is accommodated on the second portion that is a distance above a ground surface that corresponds to the length of the second portion, and the third portion is configured to contact the ground surface and is capable of supporting a weight of the user accommodated by the second of the configurable seating device.

12. The method of claim 11, further comprising:
    hingedly attaching at least one side structure to the second portion, wherein, when the at least one side structure is an upright position, resists the user from falling off the second portion; and
    positioning a securing strap proximate a second end of the first portion, the securing strap configured to wrap around a torso of the user to support the user while in the open position.

13. The method of claim 11, further comprising:
    positioning a receiver operably connected to a light source on at least one of the first portion, the second portion, and the third portion, wherein the receiver receives a transmission from a remote device to activate the light source; and
    enclosing the first portion, second portion, and the third portion with a shelter system, wherein the shelter system includes a plurality of shelter walls, a canopy, a shelter strap attached to the structure, at least one supporting rod, and at least one elastic strap.

14. The method of claim 11, wherein the first portion, the second portion, and the third portion have a continuous, solid surface.

15. The method of claim 11, wherein the configurable device includes a removable seat cushion attached to the second portion, the removable seat cushion having a rechargeable battery operably attached to the removable seat cushion, further wherein the removable seat cushion includes a heating coil disposed within to heat the removable seat cushion.

16. A folding tree seat comprising:
a rigid portion, the rigid portion operating in combination with a strap to removably secure the folding tree seat against the tree, the strap wrapping around the tree;
a rigid seat connected to the rigid portion at a first end of the rigid seat, the rigid seat including a cushion, wherein the rigid seat includes a second end distal from the first end, the second end defining an edge extending along the second end of the rigid seat from a first end of the edge to a second end of the edge; and
a rigid leg having a length that extends between a first end and a second end, the rigid leg operably connected to the rigid seat, only at the second end of the rigid seat, the rigid leg being substantially perpendicular to the rigid seat when the folding tree seat is in an unfolded position, wherein the rigid leg is pivotably connected along the edge of the rigid seat;
wherein, when the folding tree seat is in the unfolded position, the rigid leg contacts a ground surface and is capable of supporting a weight of a user while the user is sitting on the cushion of the rigid seat, the user sitting on the cushion of the rigid seat when the rigid seat is a distance above the ground surface that corresponds to the length of the rigid leg.

17. The folding tree seat of claim 16, wherein the rigid leg is substantially parallel to the rigid seat in a folded position.

18. The folding tree seat of claim 16, wherein at least one of the rigid leg, the rigid seat, and the rigid portion are comprised of metal.

19. The folding tree seat of claim 16, further a comprising a pouch.

20. The folding tree seat of claim 1, wherein the distance is equal to or greater than the length of the third portion.

21. The folding tree seat of claim 11, wherein the distance is equal to or greater than the length of the third portion.

22. The folding tree seat of claim 16, wherein the distance is equal to or greater than the length of the rigid leg.

* * * * *